US012679550B2

(12) United States Patent　　　　(10) Patent No.:　US 12,679,550 B2
Darfeuil et al.　　　　　　　　　　　(45) Date of Patent:　　Jul. 14, 2026

(54) METHOD FOR CHECKING THE MAXIMUM POWER AVAILABLE TO DIFFERENT MEMBERS OF A PROPULSION CHAIN OF AN AIRCRAFT

(71) Applicant: SAFRAN HELICOPTER ENGINES, Bordes (FR)

(72) Inventors: Pierre Alain Jean-Marie Darfeuil, Moissy-Cramayel (FR); David Bernard Martin Lemay, Moissy-Cramayel (FR); Jean-Philippe Jacques Marin, Moissy-Cramayel (FR); Romain Jean Gilbert Thiriet, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 46 days.

(21) Appl. No.: 18/716,774

(22) PCT Filed: Dec. 6, 2022

(86) PCT No.: PCT/EP2022/084556
§ 371 (c)(1),
(2) Date: Jun. 5, 2024

(87) PCT Pub. No.: WO2023/104777
PCT Pub. Date: Jun. 15, 2023

(65) Prior Publication Data
US 2025/0033785 A1　　Jan. 30, 2025

(30) Foreign Application Priority Data
Dec. 7, 2021　(FR) ....................................... 2113077

(51) Int. Cl.
　　B64D 31/16　　　(2024.01)
　　B64D 31/06　　　(2006.01)
　　B64D 27/34　　　(2024.01)

(52) U.S. Cl.
CPC ............. B64D 31/06 (2013.01); B64D 31/16 (2024.01); B64D 27/34 (2024.01); B64D 2221/00 (2013.01)

(58) Field of Classification Search
CPC ........ B64D 31/06; B64D 31/16; B64D 27/34; B64D 2221/00; B64D 2045/0085
See application file for complete search history.

(56) References Cited

U.S. PATENT DOCUMENTS

| 11,041,446 | B2 * | 6/2021 | Graham | .................... F02C 9/28 |
| 12,030,662 | B2 * | 7/2024 | Thiriet | .................. B64D 27/33 |

(Continued)

FOREIGN PATENT DOCUMENTS

| FR | 3079819 A1 | 10/2019 |
| WO | WO-2021005304 A1 | 1/2021 |
| WO | WO-2021116606 A1 | 6/2021 |

*Primary Examiner* — Mussa A Shaawat
(74) *Attorney, Agent, or Firm* — MUNCY, GEISSLER, OLDS & LOWE, P.C.

(57)　　　　　　　　ABSTRACT
A method for checking the maximum power available to members of a propulsion system of an aircraft includes first members that are sized to compensate for the failure of second members of the propulsion system by delivering a maximum power to keep the aircraft in a safe operating range. The method includes the following steps for each of the first members: placing the first member in a state that is substantially equal to a maximum power state; adjusting the power delivered by the second member working in synergy with the first member so that the first member and the second member contribute to delivering the power required for the aircraft in the flight phase; determining the power delivered by the first member placed in the maximum power state; from the determined power, deducing information relating to the maximum power available to the first member.

8 Claims, 3 Drawing Sheets

(56)                    References Cited

U.S. PATENT DOCUMENTS

| | | | |
|---|---|---|---|
| 2007/0240426 A1* | 10/2007 | Wiegman | F02C 9/00 |
| | | | 60/793 |
| 2013/0204468 A1* | 8/2013 | Camhi | G07C 5/0816 |
| | | | 701/100 |
| 2014/0222310 A1* | 8/2014 | Volponi | F02C 9/00 |
| | | | 701/101 |
| 2014/0346283 A1* | 11/2014 | Salyer | B64D 27/33 |
| | | | 903/903 |
| 2016/0236790 A1* | 8/2016 | Knapp | B64D 27/24 |
| 2017/0139894 A1* | 5/2017 | Welch | G06F 40/18 |
| 2018/0230844 A1* | 8/2018 | Vondrell | H02P 25/30 |
| 2018/0251228 A1* | 9/2018 | Sands | B64D 35/08 |
| 2019/0005826 A1* | 1/2019 | Lax | G08G 5/76 |
| 2020/0047911 A1* | 2/2020 | Parsons | B64C 27/04 |
| 2020/0063606 A1 | 2/2020 | Miller et al. | |
| 2020/0140106 A1* | 5/2020 | Dougherty | H02J 1/14 |
| 2020/0277064 A1* | 9/2020 | Thomassin | H02P 29/028 |
| 2020/0290742 A1* | 9/2020 | Kumar | B64D 27/33 |
| 2021/0108578 A1* | 4/2021 | Darfeuil | B64D 31/02 |
| 2021/0147092 A1* | 5/2021 | Brown | B64D 31/06 |
| 2021/0237887 A1* | 8/2021 | Besse | B64D 35/024 |
| 2022/0094297 A1* | 3/2022 | Lacaux | B64D 27/357 |
| 2022/0097840 A1* | 3/2022 | Acikel | B64C 29/0033 |
| 2023/0182920 A1* | 6/2023 | Moore | F02C 7/36 |
| | | | 244/53 R |
| 2023/0205229 A1* | 6/2023 | Masefield | B64D 31/16 |
| | | | 701/3 |
| 2023/0257128 A1* | 8/2023 | Freer | B64D 31/06 |
| | | | 244/55 |
| 2023/0312116 A1* | 10/2023 | Han | B64D 27/357 |
| | | | 244/53 R |
| 2024/0092497 A1* | 3/2024 | Thiriet | B64D 35/025 |
| 2024/0262520 A1* | 8/2024 | Zapata | B64C 29/0025 |
| 2025/0042563 A1* | 2/2025 | Lemay | F02K 5/00 |

* cited by examiner

Fig. 3

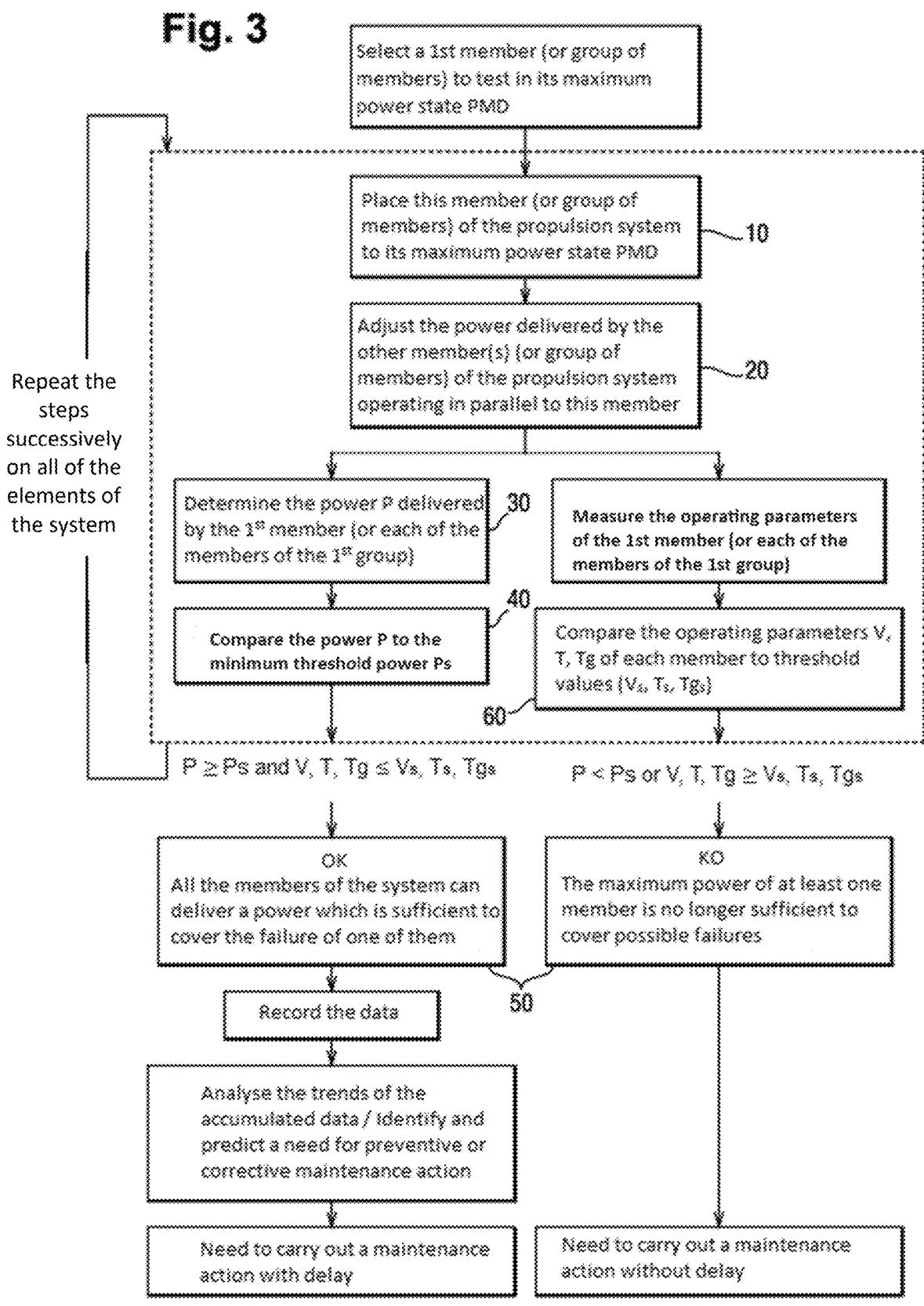

Select a 1st member (or group of members) to test in its maximum power state PMD Place this member (or group of members) of the propulsion system to its maximum power state PMD　10

Adjust the power delivered by the other member(s) (or group of members) of the propulsion system operating in parallel to this member　20

Repeat the steps successively on all of the elements of the system

Determine the power P delivered by the 1$^{st}$ member (or each of the members of the 1$^{st}$ group)　30

Measure the operating parameters of the 1st member (or each of the members of the 1st group)

Compare the power P to the minimum threshold power Ps　40

Compare the operating parameters V, T, Tg of each member to threshold values (Vs, Ts, Tgs)　60

P ≥ Ps and V, T, Tg ≤ Vs, Ts, Tgs

P < Ps or V, T, Tg ≥ Vs, Ts, Tgs

OK
All the members of the system can deliver a power which is sufficient to cover the failure of one of them KO
The maximum power of at least one member is no longer sufficient to cover possible failures Record the data　50

Analyse the trends of the accumulated data / Identify and predict a need for preventive or corrective maintenance action Need to carry out a maintenance action with delay Need to carry out a maintenance action without delay

METHOD FOR CHECKING THE MAXIMUM POWER AVAILABLE TO DIFFERENT MEMBERS OF A PROPULSION CHAIN OF AN AIRCRAFT

The present invention relates to the propulsion system of aircrafts and more specifically, a method for checking the maximum power available of members of an aircraft propulsion chain.

BACKGROUND OF THE INVENTION

For example, a helicopter is an aircraft conventionally equipped with a main rotor driving a rotating airfoil in order to ensure its lift and propulsion. In order to rotate the main rotor, it is known to equip the helicopter with a redundant propulsion system comprising two turbine engines operating in parallel. Each is designed to be oversized so as to be able to deliver, in case of failure of the other turbine engine, sufficient power to allow the helicopter to continue its flight and land in safe conditions.

It is however, not possible to test the aircraft with such an operating state called OEI ("One Engine Inoperative" or with a faulty engine), insofar as the valid turbine engine delivers a power which is greater than its rated power and is consequently damaged, so that it can no longer be used without a heavy maintenance action.

It has therefore been necessary to develop strategies to ensure the availability of the maximum power to the OEI state for each of the turbine engines.

It has been considered that during a commercial flight, for example every 25 hours, a series of temperature and rotation speed measurements for each of the turbine engines could be carried out so as to determine if, from a thermodynamic standpoint, each of the turbine engines would have the capacity to deliver the maximum power to the OEI state. This control, called EPC ("Engine Power Check"), is completed by specific maintenance operations aiming to detect possible latent failures of certain components of the turbine engines.

However, this strategy is not entirely satisfactory. In fact, the EPC control is carried out at a power level which is significantly less than the power required for take-off, which increases the uncertainty as to the capacity of turbine engines to deliver the maximum power to the OEI state. What is more, the maintenance operations are particularly delicate and complicated to implement, and require, in particular, specific tools and qualified staff, without whom the risk of maintenance errors is high.

While the document FR-A-1752849 describes a method making it possible to overcome the problems described above, it only relates to the case where the propulsion system of the aircraft comprises two combustion engines (such as turbine engines) operating in parallel.

Yet, among aircrafts, there are, for example so-called hybrid helicopters, which are equipped with a propulsion system comprising one single combustion engine, assisted during certain flight phases by a "brushless"-type electric engine. The energy required for the operation of the electric engine is provided by an auxiliary power unit ("APU") or by an electric generator, which can themselves also break down.

There are also aircrafts equipped with an all-electric propulsion system, that comprises one or more electric engines, powered by at least one battery.

It appears that the teaching of document FR-A-1752849 cannot be applied directly to aircrafts equipped with a propulsion system having multiple redundant members (active or passive and pending), as can be the case of hybrid propulsion aircrafts (thermal and electric motorisation) or with all-electric propulsion.

AIM OF THE INVENTION

The invention aims to propose a solution overcoming at least partially, some of the above-mentioned disadvantages.

SUMMARY OF THE INVENTION

To this end, a method is proposed for checking a maximum power available to members of a propulsion system of an aircraft, comprising first members sized to compensate for a failure of second members of the propulsion system by delivering a maximum power to keep the aircraft in a safe operating range, the first members comprising an electric power source, a member for distributing the electric power delivered by the electric power source and a member for transforming the power delivered by the distribution member.

According to the invention, the method comprises the following steps for each of the first members:

placing a first member in a state that is substantially equal to a maximum power state;

adjusting a power delivered by the second member working in synergy with the first member, so that the first member and the second member contribute to delivering the power required for the aircraft in the flight phase;

determining a power delivered by the first member placed in the maximum power state;

from the determined power, deducing information relating to the maximum power available to the first member.

By maximum power, this means the maximum power for particular operating conditions. There are thus several maximum powers and, for example, the maximum power for take-off for different temperatures and pressures, the maximum power in above-ground hover flight . . . . Thus, such a method has the advantage of using the maximum power state to ensure that each of the first members can deliver the maximum power to each operating state or condition in the worst case, in particular to states corresponding to particularly high powers, such as on take-off, to the OEI state, to the above-ground hover state . . . . Indeed, at the maximum power state, the power level is quite high to limit the uncertainties as to the capacity of the member to reach the expected power level. Thus, this ensures that ageing, deterioration, limitations, failures or latent errors of the first members do not prevent obtaining full power if required.

According to a particular feature, the method further comprises the following steps:

determining a threshold power corresponding to a minimum power to be reached by the first member placed in the maximum power state, and comparing the power delivered by the first member to the threshold power.

In particular, the method is automatically interrupted when at least one of the following conditions is fulfilled:

the power delivered by the first member placed in the maximum power state is less than or equal to a threshold power;

a parameter of the first member placed in the maximum power state is less or greater than a predetermined threshold;

a fault is detected on the first member placed in the maximum power state for take-off.

In particular, the method further comprises the step of collecting data from the first members during the other steps, and of enriching a model enabling a predictive analysis of needs for maintenance actions for each of said first members.

The invention also relates to a computer program product comprising instructions for the execution of such a method, when this program is executed by a processor.

The invention also relates to a control device comprising a computer configured to implement such a method.

The invention further relates to an assembly comprising at least two chains of members configured to work in synergy and together deliver a power required for an aircraft in a flight phase, the assembly being characterised in that it comprises such a control device.

The invention also relates to an aircraft comprising at least two chains of members configured to work in synergy and together deliver a power required for an aircraft in a flight phase, the aircraft being characterised in that it comprises a computer configured to implement such a method.

BRIEF DESCRIPTION OF THE DRAWINGS

The invention will be best understood in the light of the description below, which is purely illustrative and non-limiting, and must be read regarding the accompanying figures, among which:

FIG. 3 illustrates a method for checking the maximum power available of different members of an aircraft according to an embodiment of the invention.

DETAILED DESCRIPTION OF THE INVENTION

Figure 1:
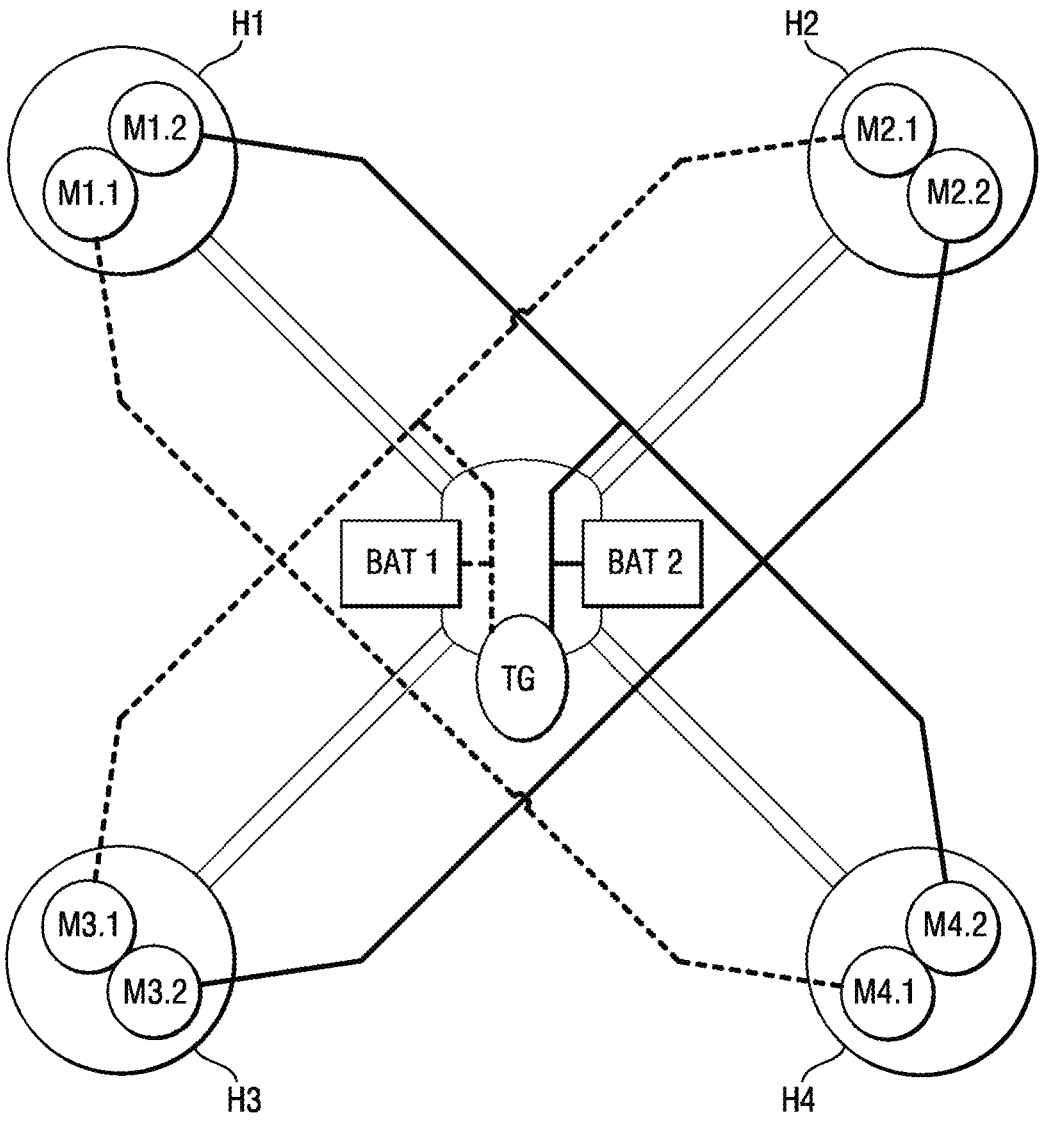
FIG. 1 is a schematic view of an electric hybrid propulsion aircraft.

In reference to FIG. 1, a Vertical Take-Off and Landing aircraft or "VTOL", in this case a drone type, comprises a propulsion system comprising four propellers H1, H2, H3, H4 used both for the propulsion and lift of the aircraft 1. Each of the propellers H1, H2, H3, H4 is rotated by a first electric engine M1.1, M2.1, M3.1, M4.1 and a second electric engine M1.2, M2.2, M3.2, M4.2. The first engine M1.1, M2.1, M3.1, M4.1 is sized to deliver the minimum power required for the propulsion and lift of the aircraft 1 in case of failure of the second engine M1.2, M2.2, M3.2, M4.2, and vice versa. Under normal operating conditions, half of the power required by the propeller H1, H2, H3, H4 is delivered by the first engines M1.1, M2.1, M3.1, M4.1, the other half being delivered by the second engine M1.2, M2.2, M3.2, M4.2, in order to minimise the wear of the electric and mechanical components of said first and second engines M1.1, M1.2, M2.1, M2.2, M3.1, M3.2, M4.1, M4.2.

The propulsion system also comprises a turbine generator TG connected to a first electric power distributor D10 powering the first engines M1.1, M2.1, M3.1, M4.1, and to a second electric power distributor D20 powering the second engines M1.2, M2.2, M3.2, M4.2. A first battery BAT1 is also connected to the first distributor D10 and is sized to complete the power delivered by the turbine generator TG and compensate for a failure of the latter. Similarly, a second battery BAT2 is connected to the second distributor D20 and is sized to complete the power delivered by the turbine generator TG and compensate for a failure of the latter.

Thus, the first engines M1.1, M2.1, M3.1, M4.1 and the second engines M1.2, M2.2, M3.2, M4.2 work in synergy in pairs to rotate the propellers H1, H2, H3, H4. The first and second distributors D10, D20 work in synergy to power the first engines M1.1, M2.1, M3.1, M4.1 and the second engines M1.2, M2.2, M3.2, M4.2. The turbine generator TG and the first battery BAT1 work in synergy to power the first distributor D10. The turbine generator TG and the second battery BAT2 work in synergy to power the second distributor D20.

Four failure situations can be considered on the propulsion system of the aircraft 1:

the first engines M1.1, M2.1, M3.1, M4.1 or the second engine M1.2, M2.2, M3.2, M4.2 of a propeller H1, H2, H3, H4 breaks down: the engine remaining active is thus urged at a power level greater than its nominal power in order to compensate for the loss of the other engine (the urging of the first and second distributors D10, D20, of the turbine generator TG and of the first and second batteries BAT1, BAT2 is modified in a lesser extent);

the first battery BAT1 or the second battery BAT2 breaks down: a solution consists in that the turbine generator TG compensates for the failure of the battery BAT1, BAT2 so as to deliver all of the electrical power required for the first and second engines M1.1, M2.1, M3.1, M4.1, M1.2, M2.2, M3.2, M4.2 to satisfy the minimum safety of the aircraft 1 (the urging of the first and second distributors D10, D20 thus remain balanced and the turbine generator TG is urged to a power level significantly greater than its normal operating power), another solution consists of unbalancing the urging of the first and second distributors D10, D20 in order to distribute the power required on the turbine generator TG and on one of the first and second batteries BAT1, BAT2;

the turbine generator TG breaks down: the first and second batteries BAT1, BAT2 must thus deliver all of the electrical power required for the first and second engines M1.1, M2.1, M3.1, M4.1, M1.2, M2.2, M3.2, M4.2 to satisfy the minimum safety of the aircraft 1, which urges them to a power level which is generally close to their maximum operating power;

the first distributor D10 or the second distributor D20 breaks down (for example, due to a short-circuit or a broken electrical cable): all of the engines M1.1, M1.2, M2.1, M2.2, M3.1, M3.2, M4.1, M4.2 powered by the remaining distribution chain D10, D20 will thus operate at a power level greater than their nominal power, just like the turbine generator TG and the corresponding battery BAT1, BAT2.

Figure 2:
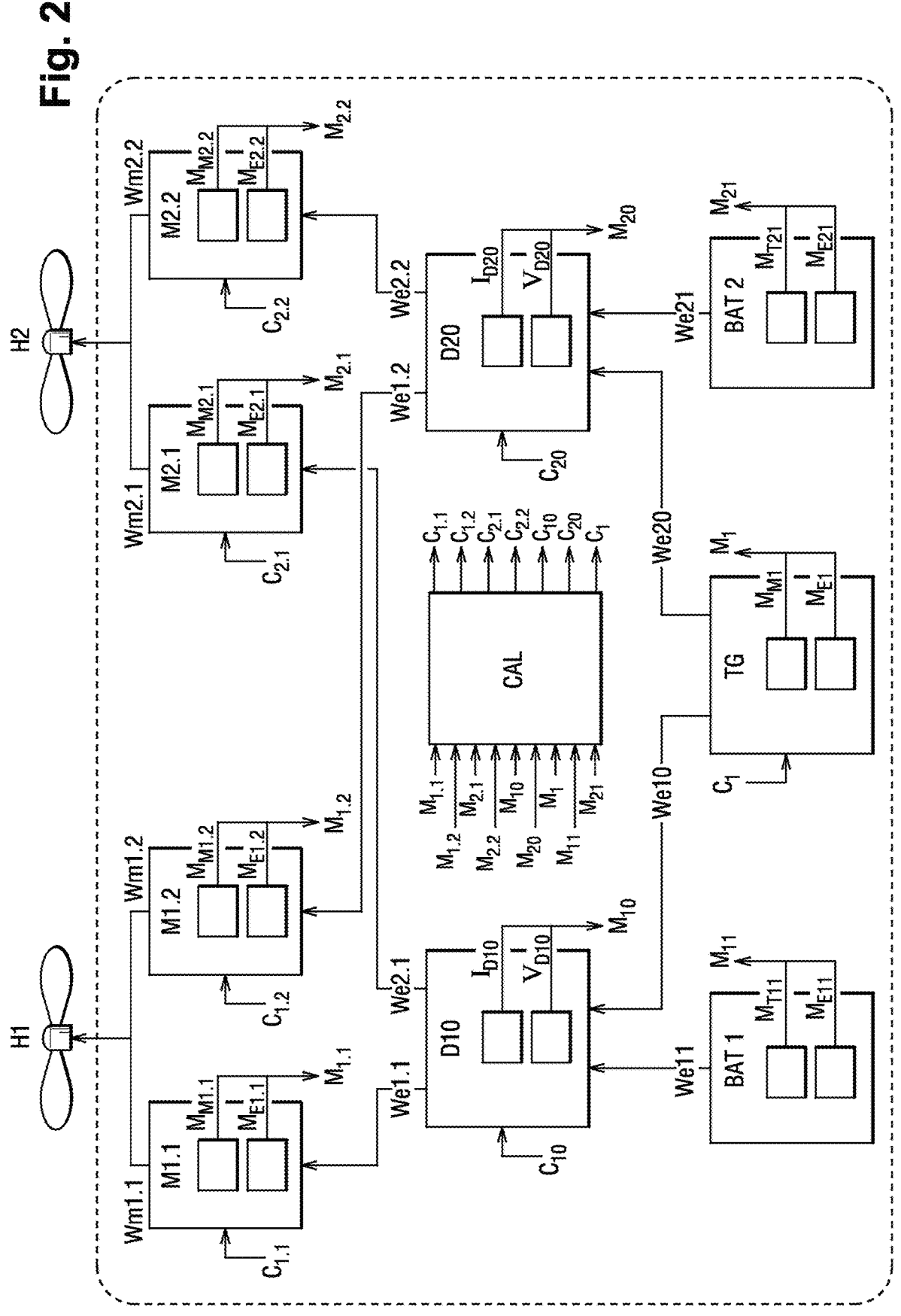
FIG. 2 is a view representing partially and schematically the architecture of the electric hybrid propulsion of the aircraft illustrated in FIG. 1.

FIG. 2 schematically represents the architecture of the propulsion system of the aircraft 1. For more clarity, only the propellers H1, H2 are represented.

The turbine generator TG delivers electrical power We10 to the first distributor D10 and electrical power We20 to the second distributor D20. Similarly, the first battery BAT1 delivers electrical power We11 to the first distributor D10 and the second battery BAT2 delivers electrical power We21 to the second distributor D20.

The first distributor D10 itself delivers electrical power We1.1 to the first engine M1.1 of the propeller H1 and electrical power We2.1 to the first engine M2.1 of the propeller H2. Similarly, the second distributor D20 delivers electrical power We1.2 to the second engine M1.2 of the propeller H1 and electrical power We2.2 to the second engine M2.2 of the propeller H2.

The first engine M1.1 and the second engine M1.2 deliver respectively a mechanical power Wm1.1 and a mechanical power Wm1.2 both of which are used to rotate the propeller H1. Similarly, the first engine M2.1 and the second engine M2.2 deliver respectively a mechanical power Wm2.1 and a mechanical power Wm2.2 both of which are used to rotate the propeller H2. In normal operation, the mechanical power required to rotate the propellers H1, H2 is distributed evenly on the corresponding first engine M1.1, M2.1 and second engine M1.2, M2.2.

The propeller H1, the first engine M1.1, the second engine M1.2, the first and second distributors D10, D20, the first and second batteries BAT1, BAT2 and the turbine generator TG each form a member of a first propulsion chain of the aircraft 1. It is understood that these "members" or "power members" have a direct role in the production and the operation of the power required for the flight of the aircraft 1. Similarly, the propeller H2, the first engine M2.1, the second engine M2.2, the first and second distributors D10, D20, the first and second batteries BAT1, BAT2 and the turbine generator TG each form a member of a second propulsion chain of the aircraft 1. Thus, the first and second distributors D10, D20, the first and second batteries BAT1, BAT2 and the turbine generator TG are members common to the first and second propulsion chains of the aircraft 1.

The aircraft 1 is further equipped with a control device comprising a computer CAL configured to act:

on the first and second engines M1.1, M1.2, M2.1, M2.2 via command instructions C1.1, C1.2, C2.1, C2.2;

on the first and second distributors D10, D20 via command instructions C10, C20; and on the turbine generator TG via command instructions C1.

It will be noted that the first and second distributors D10, D20 can comprise active electrical converters enabling the computer CAL to vary, via the instruction commands C10, C20, the power delivered by the first and second batteries BAT1, BAT2 and/or the turbine generator TG.

The computer CAL thus makes it possible to act on each of the members of the first and second propulsion chains of the aircraft 1, so as, in particular in the event of a failure of one of the members, to place the member, which works in synergy with the faulty member, in a maximum power state and to adjust the power delivered by the other members, so as to satisfy the minimum safety of the aircraft 1.

The computer CAL is also configured to acquire measurements of different operating parameters for each of the members of the first and second propulsion chains. In particular, the computer CAL can acquire:

mechanical and thermal measurements $M_{M1.1}$, $M_{M1.2}$, $M_{M2.1}$, $M_{M2.2}$ for each of the first and second engines M1.1, M1.2, M2.1, M2.2 including the effective rotational speed, the torque transmitted and the operating temperature (taken, for example, at the coils or power transistors of the first and second engines M1.1, M1.2, M2.1, M2.2);

electrical measurements $M_{E1.1}$, $M_{E1.2}$, $M_{E2.1}$, $M_{E2.2}$ for each of the first and second engines M1.1, M1.2, M2.1, M2.2 including the electric current flowing in the coil of the first and second engines M1.1, M1.2, M2.1, M2.2, the voltage and/or the power supply current of said first and second engines M1.1, M1.2, M2.1, M2.2;

electrical measurements $M_{10}$, $M_{20}$ for each of the two distributors D10, D20 including the current $I_{D10}$, $I_{D20}$ and the voltage $V_{D10}$, $V_{D20}$ passing through said distributors D10, D20;

mechanical and thermal $M_{M1}$ measurements and electric $M_{E1}$ measurements of the turbine generator TG, including the temperature and the rotation speed of the turbine of the turbine generator TG, the torque delivered by said turbine to drive the electricity generator of the turbine generator TG, the current flowing in the coil of said generator . . . .

According to the invention, the computer CAL is further configured to implement a method for checking the maximum power available to the members of the propulsion system of the aircraft 1, the checking method comprising the following steps (FIG. 3):

for each of the first engines M1.1, M2.1:

placing, via the command C1.1, C2.1, the first engine M1.1, M2.1 at a state that is substantially equal to a maximum power state PM making it possible to satisfy the minimum safety of the aircraft 1 (step 10), preferably at a low electrical voltage so as to speed up the latent failures that the first engine M1.1, M2.1 could have by strongly urging the electrical components that make up the said first engine M1.1, M2.1;

adjusting, via the command C1.2, C2.2, the power Wm1.2, Wm2.2 delivered by the second engine M1.2, M2.2 working in synergy with the first engine M1.1, M2.1, so that the first engine M1.1, M2.1 and the second engine M1.2, M2.2 continue to deliver the power required for the aircraft 1 in the flight phase (step 20);

determining the power Wm1.1, Wm2.1 delivered by the first engine M1.1, M2.1 placed at maximum power state PM (step 30); and from the power Wm1.1, Wm2,1., deducing information relating to the maximum power available from the first engine M1.1, M2.1 (step 50);

for each of the second engines M1.2, M2.2:

placing, via the command C1.2, C2.2, the second engine M1.2, M2.2 in a state that is substantially equal to a maximum power state PM making it possible to satisfy the minimum safety of the aircraft 1 (step 10), preferably under a low electrical voltage so as to speed up the latent failures that the second engine M1.2, M2.2 could have, by strongly urging up the electric components that make up the said second engine M1.2, M2.2;

adjusting, via the command C1.1, C2.1, the power Wm1.1, Wm2.1 delivered by the first engine M1.1, M2.1 working in synergy with the second engine M1.2, M2.2 so that the first engine M1.1, M2.1 and the second engine M1.2, M2.2 continue to deliver the power required for the aircraft 1 in the flight phase (step 20);

determining the power Wm1.2, Wm2.2 delivered by the second engine M1.2, M2.2 placed in the maximum power state to be checked (step 30); and from the power Wm1.2, Wm2.2, deducing information relating to the maximum power available from the second engine M1.2, M2.2 (step 50);

for the first battery BAT1:

placing, via the command C10, the first battery BAT1 in a state that is substantially equal to a maximum power state PM making it possible to satisfy the minimum safety of the aircraft 1 (step 10);

adjusting, via the command C1, the power We10 delivered by the turbine generator TG so that the first battery BAT1 and the turbine generator TG continue to deliver the power required for the aircraft 1 in the flight phase (step 20);

determining the power We11 delivered by the first battery BAT1 placed in the maximum power state PM (step 30); and from the power We11, deducing information relating to the maximum power available from the first battery BAT1 (step 50);

for the second battery BAT2:

placing, via the command C20, the second battery BAT2 in a state that is substantially equal to a maximum power state PM making it possible to satisfy the minimum safety of the aircraft 1 (step 10);

adjusting, via the command C1, the power We20 delivered by the turbine generator TG so that the second battery BAT2 and the turbine generator TG continue to deliver the power required for the aircraft 1 in the flight phase (step 20);

determining the power We21 delivered by the second battery BAT2 placed in the maximum power state PM (step 30);

from the power We21, deducing information relating to the maximum power available from the second battery BAT2 (step 50);

for the turbine engine TG:

placing, via the command C10, the turbine generator TG in a state that is substantially equal to a maximum power state PM making it possible to satisfy the minimum safety of the aircraft 1 (step 10);

adjusting, via the command C1, the power We11 delivered by the first battery BAT (or, via the command C20, the power We21 delivered by the second battery BAT2) so that the turbine generator TG and the first battery BAT1 (or the second battery BAT2) continue to deliver the power required for the aircraft 1 in the flight phase (step 20);

determining the power We10 (or the power We20) delivered by the turbine generator TG placed in the maximum power state PM (step 30);

from the power We10 (or from the power We20), deducing information relating to the maximum power available from the turbine generator TG (step 50);

for each of the two distributors D10, D20:

placing, via the commands C10, C20, one of the distributors D10, D20 in a state that is substantially equal to a maximum power state PM making it possible to satisfy the minimum safety of the aircraft 1 (step 10);

adjusting, via the command C10, C20, the power We1.2, We2.2, We1.1, We2.1 delivered by the other of the distributors D10, D20 so that the distributors D10, D20 continue to deliver the power required for the aircraft 1 in the flight phase (step 20);

determining the power We1.1, We2.1, We1.2, We2.2 delivered by the distributor D10, D20 placed in the maximum power state PM (step 30); and from the power We1.1, We2.1, We1.2, We2.2, deducing information relating to the maximum power available from the distributor D10, D20 placed in the maximum power state PM (step 50).

It will be noted that, in this case, "state" means the operating conditions of the member in question. This is the "rotation speed/torque" pair for the engines M1.1, M2.1, M3.1, M4.1, M1.2, M2.2, M3.2, M4.2, the "battery voltage/current" pair for the batteries BAT1, BAT2 and the "turbine engine voltage/current" pair for the turbine generator TG . . . .

It will be understood that each of the members of the propulsion system is tested in a predetermined maximum power state in order to ensure that all of the members have no latent failure, said members being tested one after the other, or in batches when the maximum power state is identical.

The propulsion power $P_{prop}$ required for the aircraft 1 in the flight phase is, for example, provided to the control device, in particular to the computer CAL, through a user interface connected to the control device. The user interface can further be configured to display state information of the aircraft 1, for the attention of a pilot or of an operator.

The control device further comprises a memory in which is recorded for each of the members of the two propulsion chains, a predetermined threshold power $P_s$ corresponding to a minimum power to be reached by the member placed in the maximum power state PM in case of failure of the one working in synergy.

The computer CAL thus compares the power Wm1.1, Wm1.2, Wm2.1, Wm2.2, We1.1, We2.1, We1.2, We2.2, We11, We10, We20, We21 delivered by the member placed to the maximum power state PM at the threshold power $P_s$ so as to ensure that the power delivered is greater than or equal to the threshold power $P_s$ (step 40).

More specifically, if the power Wm1.1, Wm1.2, Wm2.1, Wm2.2, We1.1, We2.1, We1.2, We2.2, We11, We10, We20, We21 delivered by the member placed in the maximum power state PM is greater than or equal to the threshold power $P_s$, the computer CAL is configured to command the user interface to inform the pilot or the operator that the member placed in the maximum power state PM can deliver the threshold power $P_s$. The threshold power $P_s$ thus corresponds to the minimum power guaranteed in case of failure of the member, the power of which is adjusted. Otherwise, if the power delivered is less than the threshold power $P_s$, the computer CAL is configured to command the user interface to inform the pilot or the operator that the member placed in the maximum power state PM cannot deliver the minimum power guaranteed and that it is required to schedule a maintenance action on said member.

The computer CAL can determine the power Wm1.1, Wm1.2, Wm2.1, Wm2.2 delivered by each of the first and second engines M1.1, M1.2, M2.1, M2.2 from mechanical measurements $M_{M1.1}$, $M_{M1.2}$, $M_{M2.1}$, $M_{M2.2}$ and/or from electrical measurements $M_{E1.1}$, $M_{E1.2}$, $M_{E2.1}$, $M_{E2.2}$ acquired by the computer CAL.

The computer CAL can determine the power We1.1, We1.2, We2.1, We2.2 delivered by each of the distributors D10, D20 from electrical measurements $M_{10}$, $M_{20}$ acquired by the computer CAL.

The computer CAL can determine the power We10, We20 delivered by the turbine generator TG from electrical measurements $M_{E1}$ acquired by the computer CAL.

The computer CAL can also be configured to compare the temperature T measured of the engine M1.1, M1.2, M2.1, M2.2 placed in the maximum power state PM at a predetermined threshold temperature $T_s$ recorded in the memory of the control device, so as to ensure that the temperature measured is less than the threshold temperature $T_s$ (step 60).

More specifically, if the temperature T of the engine M1.1, M1.2, M2.1, M2.2 placed in the maximum power state PM is less than the threshold temperature $T_s$, the computer CAL is configured to command the user interface to inform the pilot or the operator that the temperature of the engine M1.1, M1.2, M2.1, M2.2 placed in the maximum power state PM does not exceed the threshold temperature $T_s$, meaning that there is no overheating of said engine M1.1, M1.2, M2.1, M2.2 when the latter is at a maximum rotation speed corresponding to the maximum power state PM.

Otherwise, if the temperature T measured of the engine M1.1, M1.2, M2.1, M2.2 placed in the maximum power state PM is greater than or equal to the threshold temperature $T_s$, the computer CAL is configured to command the user interface to inform the pilot or the operator that the engine M1.1, M1.2, M2.1, M2.2 placed in the maximum power state PM overheats and that it is required to schedule a maintenance action on said engine M1.1, M1.2, M2.1, M2.2.

The computer CAL can also be configured to compare the rotation speed V measured on the engine M1.1, M1.2, M2.1, M2.2 placed in the maximum power state PM at a threshold rotation speed $V_s$ recorded in the memory of the control device, so as to ensure that the rotation speed V measured is greater than or equal to the threshold rotation speed $V_s$(step 60).

More specifically, if the rotation speed V of the engine M1.1, M1.2, M2.1, M2.2 placed in the maximum power state PM is greater than or equal to the threshold rotation speed $V_s$, the computer CAL is configured to command the user interface to inform the pilot or the operator that the engine M1.1, M1.2, M2.1, M2.2 placed in the maximum power state PM to reach the threshold rotation speed $V_s$ when the latter is at the maximum temperature corresponding to the maximum power state PM.

Otherwise, if the rotation speed V of the engine M1.1, M1.2, M2.1, M2.2 placed in the maximum power state PM is less than the threshold rotation speed $V_s$, the computer CAL is configured to command the user interface to inform the pilot or the operator that the rotation speed of the engine M1.1, M1.2, M2.1, M2.2 placed in the maximum power state PM is limited by the maximum temperature corresponding to the maximum power state PM, and that it is required to have a maintenance action scheduled on said engine M1.1, M1.2, M2.1, M2.2.

The computer CAL can also be configured to compare the temperature Tg measured on the turbine engine TG placed in the maximum power state PM at a predetermined threshold temperature $Tg_s$ recorded in the memory of the control device, so as to ensure that the temperature Tg measured is less than the threshold temperature $Tg_s$(step 60).

More specifically, if the temperature Tg of the turbine engine TG placed in the maximum power state PM is less than the threshold temperature $Tg_s$, the computer CAL is configured to command the user interface to inform the pilot or the operator that the temperature of the turbine generator TG placed in the maximum power state PM does not exceed the threshold temperature $Tg_s$, i.e. that there is no overheating of said turbine generator TG when the turbine of the latter is at the maximum rotation speed corresponding to the maximum power state PM.

Otherwise, if the temperature Tg measured of the turbine generator TG placed in the maximum power state PM is greater than or equal to the threshold temperature $Tg_s$, the computer CAL is configured to command the user interface to inform the pilot or the operator that the temperature of the turbine generator TG placed in the maximum power state PM overheats and that it is required to schedule a maintenance action on said turbine generator TG.

To minimise the risk that the performance of the propulsion system is impacted by the potential limitation or loss of one of the tested members, and leads to a significant impact on the workload of the crew, the checking method is automatically interrupted when at least one of the following conditions is fulfilled:

the power delivered by the member placed in the maximum power state PM is less than or equal to the threshold power Ps;

a parameter of the member placed in the maximum power state of take-off PMD is less or greater than a predetermined threshold (for example, the rotation speed of one of the engines M1.1, M1.2, M2.1, M2.2 is less than the threshold rotation speed $V_s$, the temperature of one of the engines M1.1, M1.2, M2.1, M2.2 is greater than the temperature $T_s$, the temperature of the turbine generator is greater than the threshold temperature $Tg_s$ . . . );

a failure is detected on the member placed in the maximum power state PM.

Preferably, the checking method is carried out during each flight for each of the propulsion system members. In other words, preferably upon each flight, the maximum power that each of the members of the propulsion system can deliver is checked.

Moreover, the checking method is preferably carried out a flight phase, during which the effect of a failure of one of the members would be minimal, for example during a cruise phase, in the proximity of a diversion surface.

The checking method makes it possible to ensure that all of the members of the propulsion system can deliver the maximum power in each state, including in the states corresponding to particularly high speeds, such as take-off (PMD state) or in the OEI state.

In particular, the fact of using the maximum power state PM to check the maximum power available from each of the members is particularly advantageous, insofar, as in this state, the power level delivered by the member does not risk damaging it significantly if there is no latent failure.

The fact of using the maximum power state PM to check the maximum power available from each of the members further has the advantages of:

speeding up dormant or latent failures of the members;

reducing the duration of exposure to dormant failures, in particular when the checking method is carried out upon each flight for each of the members;

causing a possible failure of the member placed in the maximum power state of take-off PMD in flight conditions, in particular in cruise phase, under conditions where the consequences of such a failure are minimised (in case of failure of one of the members, the other of the members working in synergy will be less urged in the cruising phase than in another flight phase, which limits the risks of domino effects, meaning the loss of one of the members, then of the other of the members);

limiting, even avoiding maintenance operations and therefore human intervention on the members, which can themselves generate new risks and immobilise the aircraft;

being able to be completed by an EPC control; and enabling the application of the checking method on any type of flight, and in particular, a commercial flight.

The operating parameters of the different members collected during the checking method can further be stored in the memory of the control device, in view of being analysed on the ground so as to determine if the members can continue or not, to be used. The results of these analyses make it possible, for example, to best guarantee the availability of maximum power to each of the members in each state for the next flights.

Moreover, the checking method also has the advantage of being able to be carried out on any type of flight (commercial or technical) and to not disrupt the latter, whether in terms of speeds, altitude . . . .

It can be checked beforehand that the electrical power consumed by the aircraft 1 is sufficient to bring the members of the propulsion system to their maximum power state or near it. For this, the following steps are carried out:

measuring the operating parameters of the propulsion system making it possible to evaluate the power delivered by each of the members the maximum power available of which is brought to be determined (the measured parameters are for example, the rotation speed of the engines M1.1, M1.2, M2.1, M2.2, the electric current flowing in the coils of said engines M1.1, M1.2, M2.1, M2.2, the electrical current produced by the batteries BAT1, BAT2 or by the turbine generator TG), the measurement period needing to be sufficiently long (several seconds, even tens of seconds) to make it possible to have an estimation of the average power consumed and to reject brief transient variations;

determining the power consumed by each group of members from the parameters measured (the groups of members can, for example, be the engines M1.1, M1.2, M2.1, M2.2 of one same propeller H1, H2, the battery and the turbine generator powering one same propulsion chain . . . );

comparing the power consumed by each group of members with a predetermined threshold power guaranteeing the capacity of the group to carry out the maximum power availability check of under satisfactory operating and safety conditions;

enabling the checking of availability of the maximum power, when the power consumed from each group of members is greater than the threshold power defined for each of them.

The checking method can also comprise an additional step of collecting data from the members of the propulsion system and enrichment of a model enabling a predictive analysis of needs for maintenance actions for each of said members of the propulsion system. This analysis can, for example, be carried out by following the level and the trend of the parameters measured over time. The maintenance staff can thus be informed of a future maintenance operation on one or more of the members, particularly when the level of one of the parameters deteriorates more rapidly than the others, while remaining in an acceptable range.

Naturally, the invention is not limited to the embodiment described, but comprises any variant entering into the field of the invention, such as defined by the claims.

The architecture of the propulsion system of the aircraft can comprise as many electric engines as combustion engines being able to correspond to various fuels (kerosene, dihydrogen . . . ). In other words, one or more of the engines M1.1, M1.2, M2.1, M2.2 of the aircraft 1 can, for example, be replaced by combustion engines.

The architecture of the propulsion system of the aircraft can comprise as many batteries as fuel cells or other electrical energy sources. In other words, the turbine generator and/or one of the batteries can, for example, be replaced by a fuel cell.

The method applies to any architecture combining different sources of energy, distribution and power transformation.

The method applies to any type of aircraft: VTOL ("Vertical Take-Off and Landing aircraft"), STOL ("Short Take-Off and Landing aircraft") or conventional aircrafts . . . .

The members of the propulsion system can be tested individually or in groups.

The maximum power state PM can, for example, correspond to the maximum power state at take-off.

The aircraft can have a fixed or rotating airfoil, manned or unmanned, vertical, short or long take-off . . . .

The invention claimed is:

1. A method for checking a maximum power available to members of a propulsion system of an aircraft comprising first members sized to compensate for a failure of second members of the propulsion system by delivering a maximum power to keep the aircraft in a safe operating range, the first members comprising an electrical power source, a member for distributing the electric power delivered by the electrical power source and a member for transforming the power delivered by the distribution member, the method comprising the following steps for each of the first members:

placing the first member in a state that is substantially equal to a maximum power state;

adjusting a power delivered by the second member working in synergy with the first member, so that the first member and the second member contribute to delivering the power required for the aircraft in the flight phase;

determining a power delivered by the first member placed in the maximum power state;

from the determined power, deducing information relating to the maximum power available to the first member.

2. The method according to claim 1, comprising the following additional steps:

determining a threshold power corresponding to a minimum power to be reached by the first member placed in the maximum power state, and comparing the power delivered by the first member with the threshold power.

3. The method according to claim 1, automatically interrupted when at least one of the following conditions is fulfilled:

the power delivered by the first member placed in the maximum power state is less than or equal to a threshold power a parameter of the first member placed in the maximum power state is less or greater than a predetermined threshold, a failure is detected on the first member placed in the maximum power state of take-off.

4. The method according to claim 1, further comprising the step of collecting data from the first members during the other steps, and of enriching a model enabling a predictive analysis of needs for maintenance actions for each of said first members.

5. A computer program product on a non-transitory storage medium comprising instructions for the execution of the method according to claim 1 when this program is executed by a processor.

6. A control device comprising a computer configured to implement the method according to claim 1.

7. An assembly comprising at least two chains of members configured to work in synergy and together deliver a power required to an aircraft in a flight phase, wherein the aircraft comprises the control device according to claim 6.

8. An aircraft comprising at least two chains of members configured to work in synergy and together deliver a power required to an aircraft in a flight phase, wherein the aircraft comprises a computer configured to implement the method according to claim 1.

\* \* \* \* \*